(12) United States Patent
Liu et al.

(10) Patent No.: US 10,675,911 B2
(45) Date of Patent: Jun. 9, 2020

(54) VEHICLE WHEEL ISOLATOR

(71) Applicant: GM GLOBAL TECHNOLOGY OPERATIONS LLC, Detroit, MI (US)

(72) Inventors: Ming Liu, Pudong (CN); JinLong Zhu, Yancheng (CN); Jianfeng Wang, Nanjing (CN)

(73) Assignee: GM Global Technology Operations, Detroit, MI (US)

( * ) Notice: Subject to any disclaimer, the term of this patent is extended or adjusted under 35 U.S.C. 154(b) by 250 days.

(21) Appl. No.: 15/895,404

(22) Filed: Feb. 13, 2018

(65) Prior Publication Data
US 2019/0248176 A1    Aug. 15, 2019

(51) Int. Cl.
B60B 3/14      (2006.01)
B60B 7/06      (2006.01)

(52) U.S. Cl.
CPC .............. B60B 3/147 (2013.01); B60B 3/14 (2013.01); *B60B 7/066* (2013.01); *B60B 2360/102* (2013.01); *B60B 2360/104* (2013.01); *B60B 2900/141* (2013.01)

(58) Field of Classification Search
CPC ............ B60B 3/14; B60B 3/145; B60B 3/147
See application file for complete search history.

(56) References Cited

U.S. PATENT DOCUMENTS

| | | | | |
|---|---|---|---|---|
| 6,296,319 B1* | 10/2001 | Hummel | ................... | B60B 1/14 |
| | | | | 301/35.621 |
| 6,626,502 B1* | 9/2003 | Petrak | ..................... | B60B 3/147 |
| | | | | 301/35.629 |
| 7,438,366 B2* | 10/2008 | Machamer | .............. | B60B 3/008 |
| | | | | 152/396 |
| 7,704,009 B2* | 4/2010 | Boote | ................... | F04D 29/263 |
| | | | | 301/35.627 |
| 8,092,923 B2 | 1/2012 | Thamida | | |
| 9,463,665 B2* | 10/2016 | Kleber | ....................... | B60B 3/16 |
| 2001/0048241 A1* | 12/2001 | Yoshimura | .............. | B60B 3/044 |
| | | | | 301/37.101 |
| 2005/0067229 A1* | 3/2005 | Gabourie | ............... | F16J 15/106 |
| | | | | 188/71.1 |
| 2005/0184578 A1* | 8/2005 | Fielden | ................... | B60B 3/145 |
| | | | | 301/35.621 |
| 2006/0017315 A1* | 1/2006 | Roberts | ................... | B60B 3/145 |
| | | | | 301/35.629 |

* cited by examiner

*Primary Examiner* — Jason R Bellinger
(74) *Attorney, Agent, or Firm* — Quinn IP Law

(57) ABSTRACT

An isolator for a wheel hub between a brake rotor and a wheel is described, and includes a disk-shaped annular device including an inner ring, an outer ring, a first face portion, a second face portion, a plurality of apertures, a plurality of drain surface portions, and a plurality of radially-oriented drain channels disposed on the first face portion. Each drain channel is recessed in the first face portion. Each drain surface portion is recessed in the first face portion and is fluidly coupled to one of the drain channels. Each of the drain surface portions includes a continuous surface that is recessed from the first face portion between a drainage curve, a respective drain channel, and an arc that is defined on the inner ring between a first point and the respective drain channel.

19 Claims, 3 Drawing Sheets

VEHICLE WHEEL ISOLATOR

The use of dissimilar metals in vehicle wheel/hub arrangements may lead to galvanic corrosion in the presence of water.

SUMMARY

An isolator configured to be disposed on a wheel hub between a brake rotor and a wheel is described, and includes a disk-shaped annular device including an inner ring, an outer ring, a first face portion, a second face portion, a plurality of apertures, a plurality of drain surface portions, and a plurality of radially-oriented drain channels disposed on the first face portion. Each of the drain channels is disposed between adjacent ones of the apertures, is recessed in the first face portion, traverses between the inner ring and the outer ring, and defines a first radial line. Each of the drain surface portions is recessed in the first face portion and is fluidly coupled to one of the drain channels. A first one of the drain surface portions is disposed on and is fluidly coupled to a first side of one of the drain channels and a second one of the drain surface portions is disposed on and is fluidly coupled to a second side of the one of the drain channels, wherein the first side is opposed to the second side of the one of the drain channels. A second radial line is defined by a radial line traversing a centerline of an adjacent one of the apertures. A first point is defined on the surface of the first face portion and is located on the second radial line proximal to the inner ring, a second point is defined on the surface of the first face portion and is located proximal to the drain channel, and a drainage curve is formed between the first and second points. Each of the drain surface portions includes a continuous surface that is recessed from the first face portion between the drainage curve, the respective drain channel, and an arc that is defined on the inner ring between the first point and the respective drain channel.

An aspect of the disclosure includes each point of the drainage curve being above the second point in the radial direction when the second radial line is disposed in a vertical orientation.

Another aspect of the disclosure includes the apertures being lug bolt receiving holes.

Another aspect of the disclosure includes the apertures being symmetrically disposed about a circumference at a common radial length.

Another aspect of the disclosure includes each of the drain channels being a semi-cylindrical surface that is recessed in the first face portion.

Another aspect of the disclosure includes the second point being located proximal to the drain channel at a radial distance halfway between the inner ring and the outer ring.

Another aspect of the disclosure includes the second point being disposed proximal to a first side of the drain channel.

Another aspect of the disclosure includes the inner ring forming an aperture for the wheel hub.

Another aspect of the disclosure includes the first face portion being disposed towards the brake rotor and the second face portion is disposed towards the wheel.

Another aspect of the disclosure includes each drain channel having a predefined maximum axial depth relative to the first face.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As employed herein, the term "above" and related terms refer to elements that are physically located at a higher place relative to an indicated location.

Figure 1:
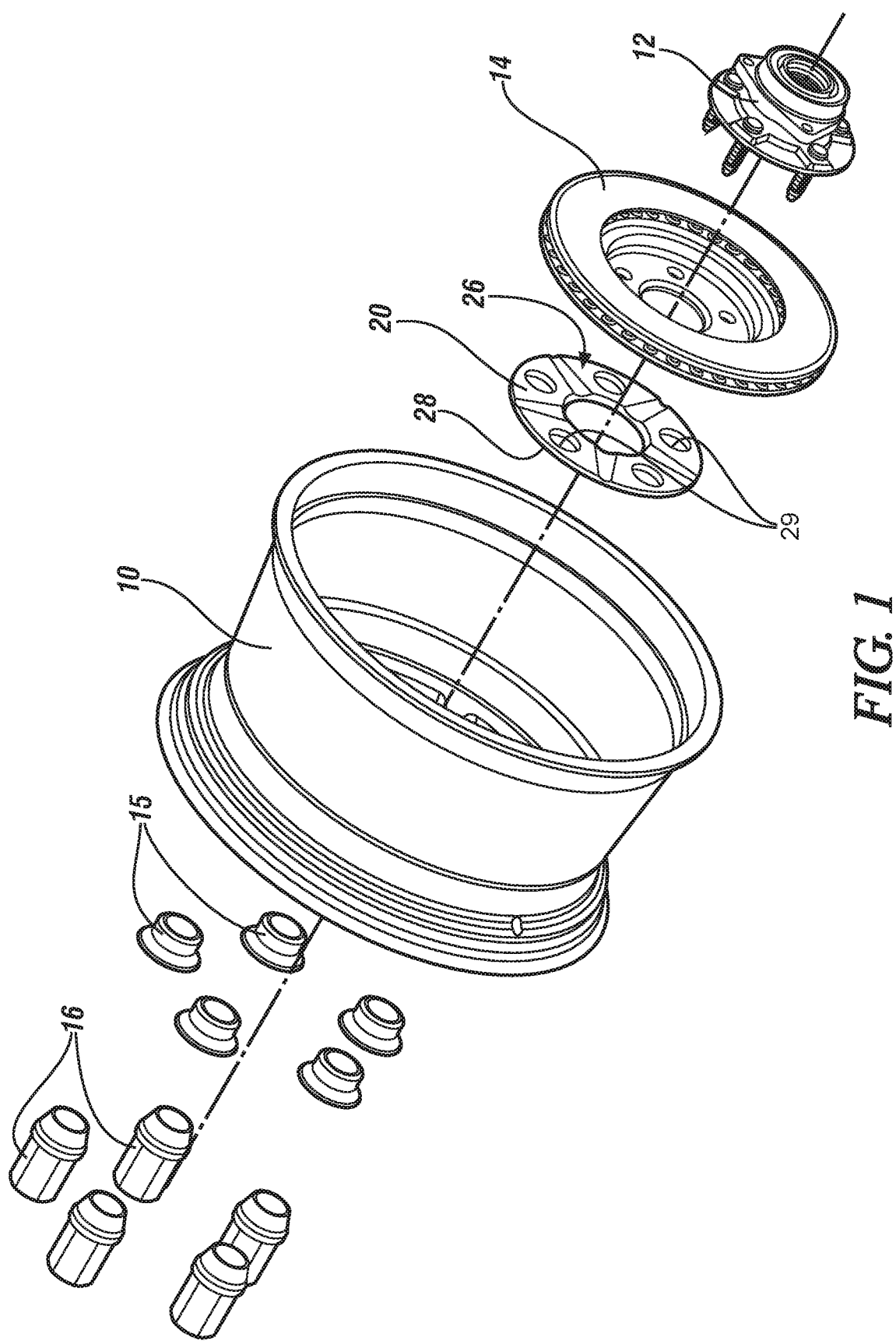
FIG. 1 illustrates an exploded isometric view of a wheel assembly that includes a wheel disposed on a wheel hub and brake rotor with an isolator interposed therebetween, in accordance with the disclosure.

Referring to the drawings, wherein like reference numerals correspond to like or similar components throughout the several Figures, FIG. 1, consistent with embodiments disclosed herein, illustrates an exploded isometric view of a wheel assembly for a vehicle that includes a wheel 10 that is disposed on a wheel hub 12 and brake rotor 14 with an embodiment of a novel isolator 20 interposed therebetween. Other elements may include a plurality of wheel mounting attachment fasteners, e.g., bushings 15 and lug nuts 16 as shown. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The wheel 10 may be fabricated from aluminum, magnesium, steel or another metal or metal alloy. The wheel hub 12 and brake rotor 14 may be fabricated from cast iron, steel or another metal or metal alloy that is dissimilar to the metal or metal alloy from which the wheel 10 has been fabricated. The bushings 15 may be fabricated from aluminum. The isolator 20 may be fabricated from aluminum or another material. In one embodiment, and as shown, the isolator 20 is disposed between the brake rotor 14 and the wheel 10 such that a first face portion 26 of the isolator 20 is adjacent to the brake rotor 14 and a second, opposed face portion 28 of the isolator is adjacent to the wheel 10.

Figure 2:
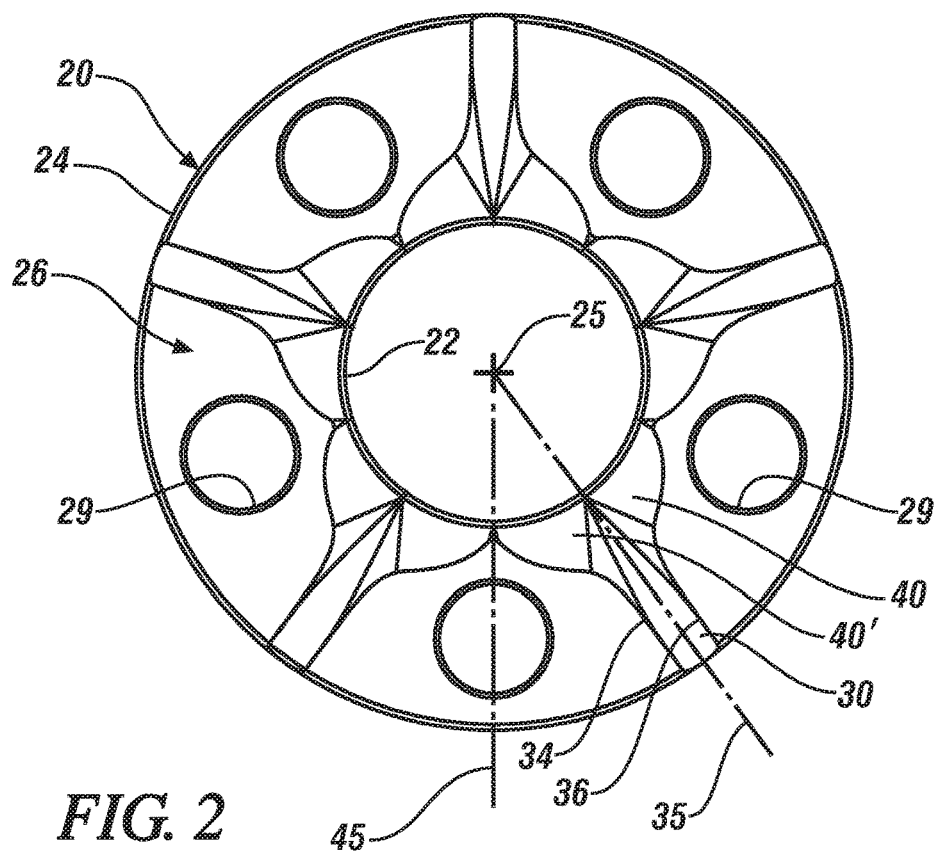
FIG. 2 schematically illustrates a front perspective view of a first side of an embodiment of the isolator, in accordance with the disclosure.
Figure 3:
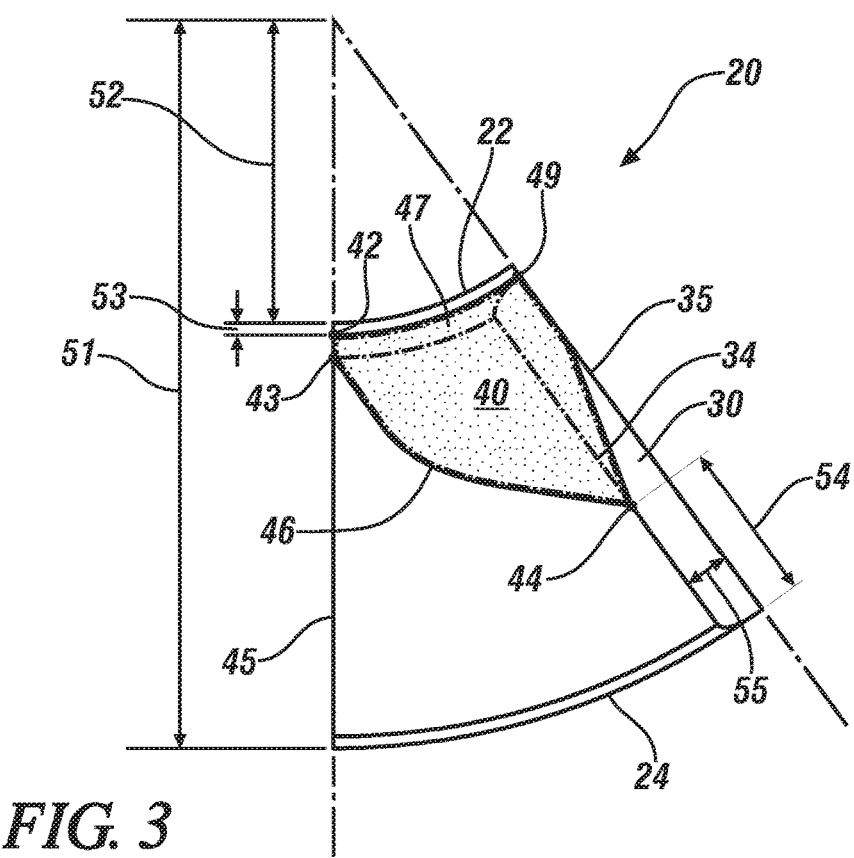
FIG. 3 schematically illustrates a cutaway isometric front view of a portion of an embodiment of the isolator, in accordance with the disclosure.
Figure 4:
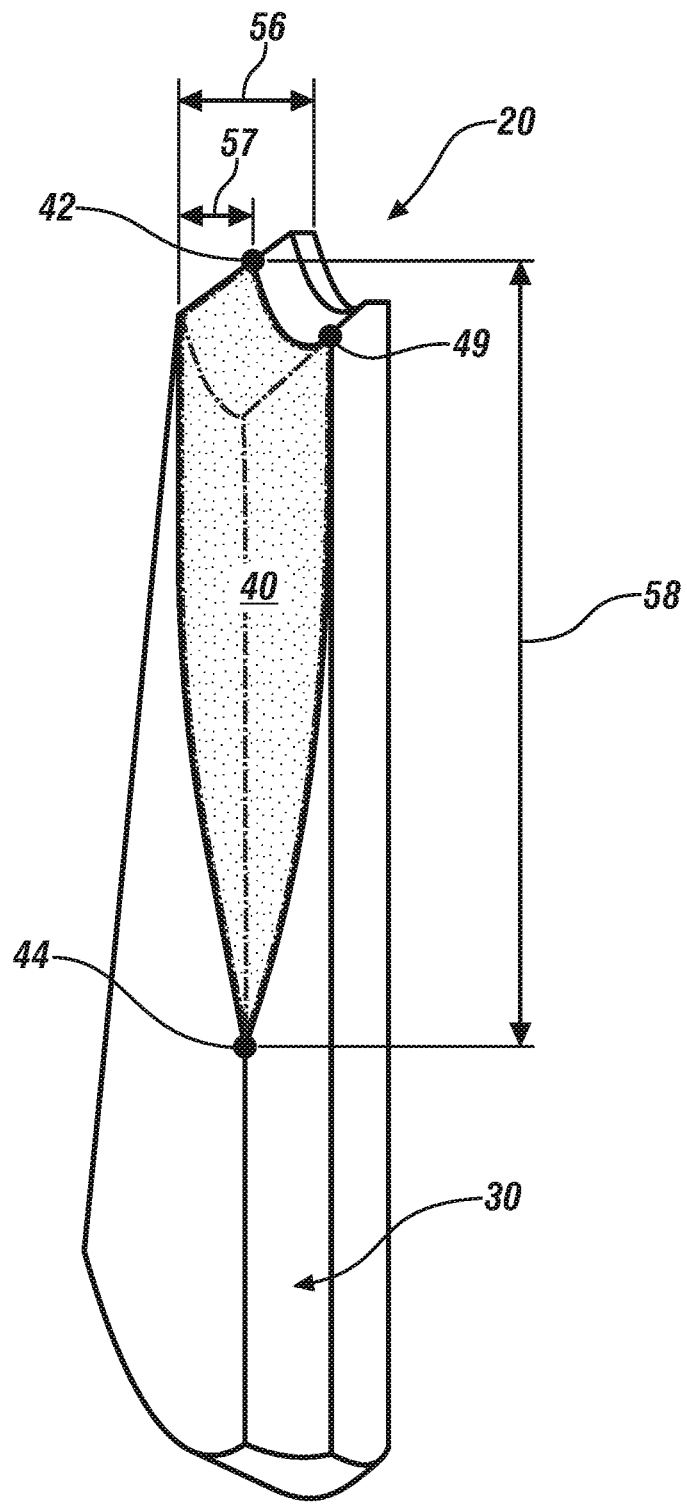
FIG. 4 schematically illustrates a cutaway isometric side view of a portion of an embodiment of the isolator in accordance with the disclosure.

FIGS. 2, 3 and 4 schematically illustrate different perspectives of the isolator 20 in order to illustrate various details associated therewith. The isolator 20 is configured to include a plurality of novel drainage patterns that are designed and fabricated to drain water that may accumulate at the interface of two contacting symmetric components, e.g., the wheel 10 and the brake rotor 14, which may be fabricated from dissimilar metals and thus subjected to galvanic corrosion in-use.

FIG. 2 schematically illustrates a front view of an embodiment of the isolator 20, which is configured as a disk-shaped annular device including an inner ring 22, an outer ring 24, the first face portion 26, the second face portion 28 (shown with reference to FIG. 1 on the opposite side of the first face portion 26) and a plurality of apertures in the form of lug bolt receiving holes 29. The isolator 20 includes a plurality of radially-oriented drain channels 30 and a plurality of drain surface portions 40 that are disposed on the first face portion 26. A center point 25 defining an axis of rotation, a first radial line 35 and a second radial line 45 are indicated as well. The isolator 20 may be fabricated by stamping, patterned machining, powdered metal casting or another process. The apertures 29 are symmetrically oriented about the center point 25 and are configured to accommodate the lug nuts 16 and bushings 15 that are shown with reference to FIG. 1.

FIG. 3 schematically illustrates a cutaway isometric front view of a portion of the isolator 20, including details related to one of the radially-oriented drain channels 30 and one of the drain surface portions 40 that are disposed on the first face portion 26.

FIG. 4 schematically illustrates a cutaway isometric side view of a portion of the isolator 20, including details related to one of the radially-oriented drain channels 30 and one of the drain surface portions 40 that are disposed on the first face portion 26.

The isolator 20 has an axial thickness 56 that is uniform with the exception of the portions at which the drain channels 30 and the drain surface portions 40 are located. The axial depth 57 of the drain surface portion 40 of the isolator 20 proximal to the inner ring 22 is indicated, and is equivalent to the maximum axial depth of the drain channel 30. Each of the drain channels 30 includes a radially-disposed surface having a semi-cylindrical cross-section that is formed by a recess in the first face portion 26 and traverses between the inner ring 22 and the outer ring 24. A centerline of the drain channel 30 defines the first radial line 35 that is associated with the respective drain channel 30. The drain channels 30 may, alternatively, be configured to have a V-shaped cross-section, a square-shaped cross-section, a semi-elliptical cross-section, or another cross-section. The second radial line 45 is defined by a radial line traversing a centerline of an adjacent one of the lug bolt receiving holes 29 and the center point 25.

Each of the drain channels 30 includes a first side 34 and a second side 36, wherein the first and second sides are parallel with the first radial line 35 and are formed at intersections between the drain channel 30 and the respective sides of the first face portion 26 of the isolator 20.

There are drain surface portions 40, 40' on opposed sides of each drain channel 30, and the opposed drain surface portions 40, 40' for each drain channel 30 are mirror images of each other. A coupled drain channel is formed by one of the drain channels 30 and either the drain surface portion 40 or the drain surface portion 40'.

Each of the drain surface portions 40 includes a surface that is recessed from the first face portion 26 and is fluidly coupled to one of the drain channels 30. The first drain surface portion 40 is disposed on and fluidly coupled to the first side 34 of the respective drain channel 30 and the second drain surface portion 40' is disposed on and fluidly coupled to a second side 36 of the respective drain channel 30.

Each of the drain surface portions 40 is recessed from the first face portion 26 of the isolator 20 and is defined by a drainage curve 46 that is disposed between a first point (point A) 42, a second point (Point B) 44, an arc defined on the inner ring 22 between the first point 42 and the corresponding drain channel 30, and the drain channel 30.

The first point (point A) 42 is defined at a recessed point from the surface of the first face portion 26 and is located on the second radial line 45 proximal to the inner ring 22.

The second point (point B) 44 is defined on the surface of the first face portion 26 at a point at which a drainage curve 46 intersects with the first side 34 of the respective drain channel 30. In one embodiment, second point 44 is located on the first side 34 of the respective drain channel 30 at about half distance between the inner ring 22 and the outer ring 24.

A third point (point C) 49 is defined at a recessed portion from the first face portion 26 and is located on the first radial line 35 in the corresponding drain channel 30.

A fourth point (point A') 43 is defined on the first face portion 26 and is located on the second radial line 45 proximal to the inner ring 22. The first point 42 and the fourth point 43 differ in location only at depth 57 of the drain surface portion 40. The depth 57 is defined as an axial depth of the drain channel 30.

The drainage curve 46 is a continuous, uninterrupted line that is formed between the first and second points 42, 44. The drain surface portion 40 is a continuous surface that is recessed from the first face portion 26 at the depth 57 of the drain channel 30. The drain surface portion 40 is circumscribed by the drainage curve 46, the corresponding drain channel 30, and an arc 47 disposed on the inner ring 22 between the first point 42 and the third point (Point C) 49 that is disposed on the first radial line 35 in the corresponding drain channel 30.

Other parameters of interest including the diameter 51 of the outer ring 24, the diameter 52 of the inner ring 22, the radial distance 53 between the first point 42 and the inner ring 22, a radial distance 54 between the second point 44 and the outer ring 24, a depth 55 between the first radial line 35 and the first side 34 of the drain change 30, and a vertical distance 58 between the first point 42 and the second point 44.

The drainage curve 46 is composed such that all points on the drainage curve 46 are located above the second point 44 in the radial direction when the second radial line 45 is disposed in a vertical orientation. As such, fluid that may become lodged between the brake rotor 14 and the isolator 20 is able to drain through one of the drain surface portions 40 and corresponding drain channel 30 through the force of gravity.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An isolator configured to be disposed on a wheel hub between a brake rotor and a wheel, comprising:
   a disk-shaped annular device including an inner ring, an outer ring, a first face portion, a second face portion, a plurality of apertures, a plurality of drain surface portions, and a plurality of radially-oriented drain channels disposed on the first face portion;
   wherein each of the drain channels is disposed between adjacent ones of the apertures;
   wherein each of the drain channels is recessed in the first face portion, traverses between the inner ring and the outer ring, and defines a first radial line;
   wherein each of the drain surface portions is recessed in the first face portion and is fluidly coupled to one of the drain channels to form a coupled drain channel;
   wherein a first one of the drain surface portions is disposed on and fluidly coupled to a first side of one of the drain channels and wherein a second one of the drain surface portions is disposed on and fluidly coupled to a second side of the one of the drain channels, wherein the first side is opposed to the second side of the one of the drain channels;
   wherein a second radial line is defined by a radial line traversing a centerline of an adjacent one of the apertures;
   wherein a first point is defined on a surface of the first face portion and is located on the second radial line proximal to the inner ring;
   wherein a second point is defined on the surface of the first face portion and is located proximal to the one of the drain channels;
   wherein a drainage curve is formed between the first and second points; and
   wherein each of the drain surface portions includes a continuous surface that is recessed from the first face portion between the drainage curve, the drain channel, and an arc that is defined on the inner ring between the first point and the drain channel.

2. The isolator of claim 1, wherein each point of the drainage curve is above the second point in the radial direction when the second radial line is disposed in a vertical orientation.

3. The isolator of claim 1, wherein the apertures comprise lug bolt receiving holes.

4. The isolator of claim 1, wherein the apertures are symmetrically disposed about a circumference at a common radial length.

5. The isolator of claim 1, wherein each of the drain channels comprises a semi-cylindrical surface that is recessed in the first face portion.

6. The isolator of claim 1, wherein the second point is located proximal to the drain channel at a radial distance halfway between the inner ring and the outer ring.

7. The isolator of claim 1, wherein the second point is located proximal to a first side of the drain channel.

8. The isolator of claim 1, wherein the inner ring forms another aperture for the wheel hub.

9. The isolator of claim 1, wherein the first face portion is disposed towards the brake rotor and the second face portion is disposed towards the wheel.

10. The isolator of claim 1, wherein each of the drain channels has a predefined maximum axial depth relative to the first face portion.

11. An isolator configured to be disposed on a wheel hub between a brake rotor fabricated from a first alloy and a wheel fabricated from a second alloy dissimilar to the first alloy, comprising:
    a disk-shaped annular device fabricated from the first alloy and including an inner ring, an outer ring, a first face portion, a second face portion, a plurality of apertures, a plurality of drain surface portions, and a plurality of radially-oriented drain channels disposed on the first face portion;
    wherein the first face portion is disposed towards the brake rotor and the second face portion is disposed towards the wheel;
    wherein each of the drain channels is disposed between adjacent ones of the apertures;
    wherein each of the drain channels is recessed in the first face portion, traverses between the inner ring and the outer ring, and defines a first radial line;
    wherein each of the drain surface portions is recessed in the first face portion and is fluidly coupled to one of the drain channels to form a coupled drain channel;
    wherein a first one of the drain surface portions is disposed on and fluidly coupled to a first side of the coupled drain channel and wherein a second one of the drain surface portions is disposed on and fluidly coupled to a second side of the coupled drain channel, wherein the first side is opposed to the second side of the coupled drain channel;
    wherein a second radial line is defined by a radial line traversing a centerline of an adjacent one of the apertures;
    wherein a first point is defined on the surface of the first face portion and is located on the second radial line proximal to the inner ring;
    wherein a second point is defined on the surface of the first face portion and is located proximal to the one of the drain channels;
    wherein a drainage curve is formed between the first and second points; and
    wherein each of the drain surface portions includes a continuous surface that is recessed from the first face portion between the drainage curve, the drain channel, and an arc that is defined on the inner ring between the first point and the drain channel.

12. The isolator of claim 11, further comprising each point of the drainage curve being above the second point in the radial direction when the second radial line is disposed in a vertical orientation.

13. The isolator of claim 12, further comprising the apertures being lug bolt receiving holes.

14. The isolator of claim 13, further comprising the apertures being symmetrically disposed about a circumference at a common radial length.

15. The isolator of claim 14, further comprising each of the drain channels being a semi-cylindrical surface that is recessed in the first face portion.

16. The isolator of claim 15, further comprising the second point being disposed proximal to the drain channel at a radial distance halfway between the inner ring and the outer ring.

17. The isolator of claim 16, further comprising the second point being located proximal to a first side of the drain channel.

18. The isolator of claim 17, further comprising the inner ring forming an aperture for the wheel hub.

19. The isolator of claim 18, further comprising each of the drain channels having a predefined maximum axial depth relative to the first face portion.

* * * * *